United States Patent [19]

Tayebi et al.

[11] Patent Number: 5,220,754
[45] Date of Patent: Jun. 22, 1993

[54] RECOVERED COMPACT DISK AND A METHOD AND AN APPARATUS FOR RECOVERY THEREOF

[76] Inventors: Amad Tayebi, 5 Seqouia Rd., Westford, Mass. 01886; Robert A. Malloy, 13 King Charles Dr., Londonderry, N.H. 03053

[21] Appl. No.: 844,236

[22] Filed: Mar. 2, 1992

[51] Int. Cl.⁵ ............................................. B24B 1/00
[52] U.S. Cl. .................................. 51/281 SF; 51/328
[58] Field of Search .................. 51/281 SF, 413, 418, 51/76 R, 138, 235, 326, 328

[56] References Cited

U.S. PATENT DOCUMENTS

| | | | |
|---|---|---|---|
| 3,627,338 | 12/1971 | Thompson | 51/235 |
| 4,009,540 | 3/1977 | Uijen | 51/216 CP |
| 4,599,131 | 7/1986 | Matuszak | 51/328 |
| 4,827,676 | 5/1989 | Kindermann | 51/328 |
| 5,099,618 | 3/1992 | Schmid | 51/281 SF |

*Primary Examiner*—M. Rachuba

[57] ABSTRACT

A method is described for recovery of Compact Disks and other optical memory storage disks for potential subsequent uses and for recycling purposes. The method comprises the steps of holding the compact disk and application of a scraping action to the coating on the disk surface. An apparatus is also described for holding the disk and scraping the coating on the disk surface.

6 Claims, 9 Drawing Sheets

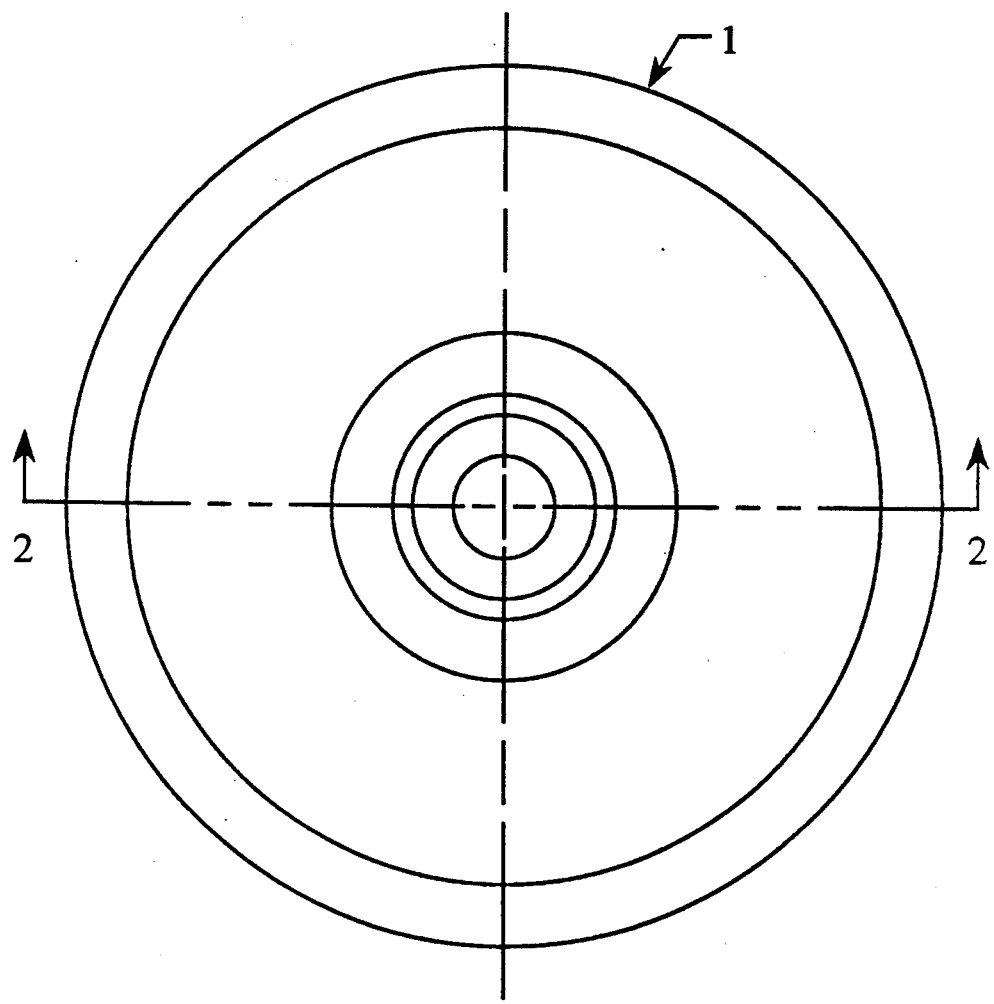
Figure (1)
Prior Art

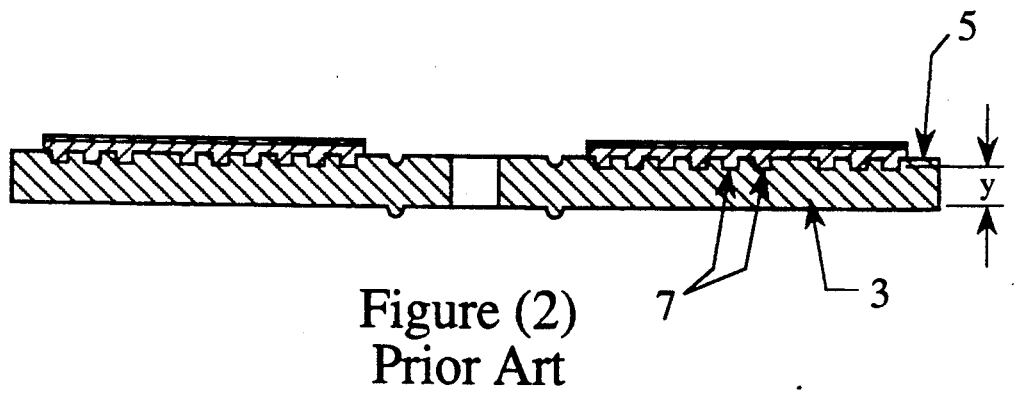
Figure (2)
Prior Art
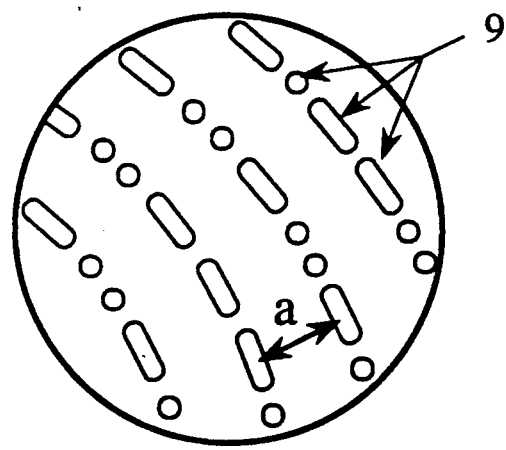
Figure (3)
Prior Art

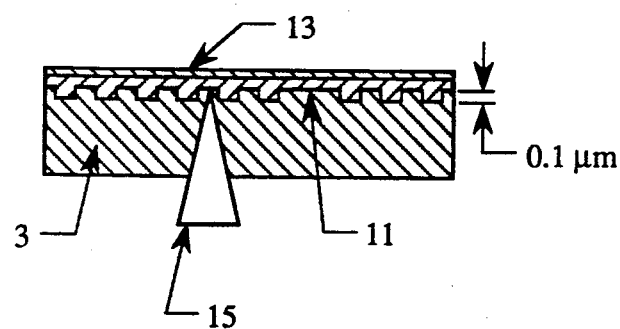
Figure (4)
Prior Art
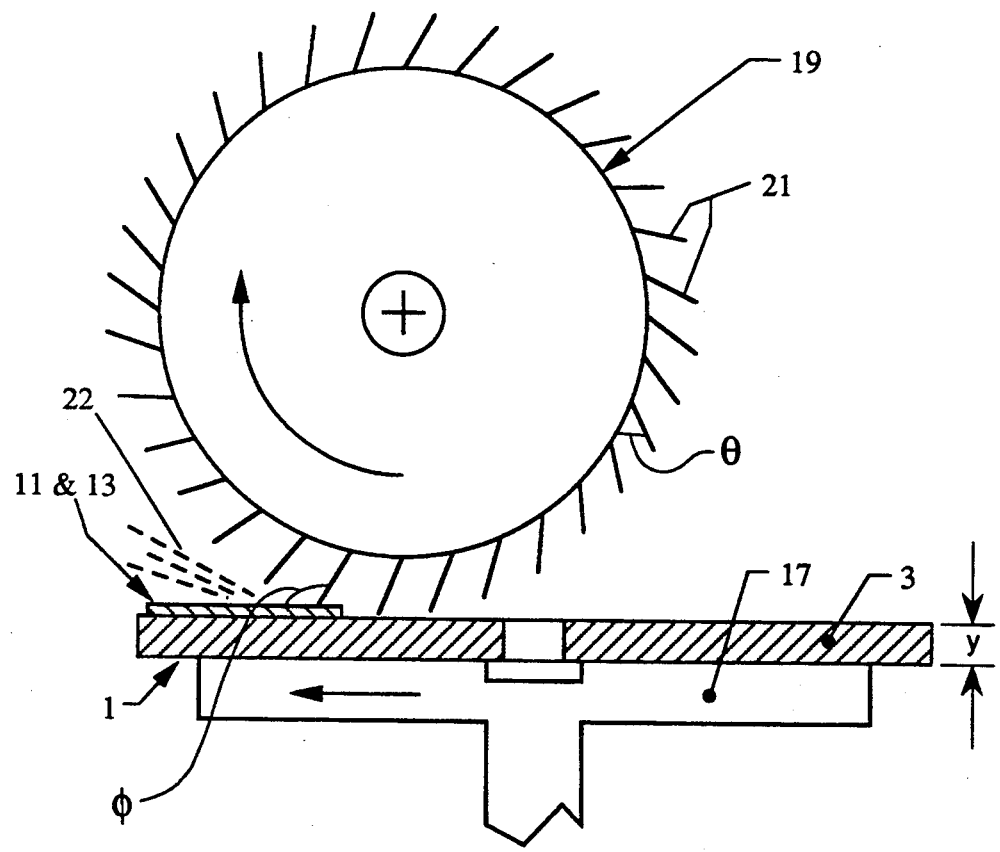
Figure (5)

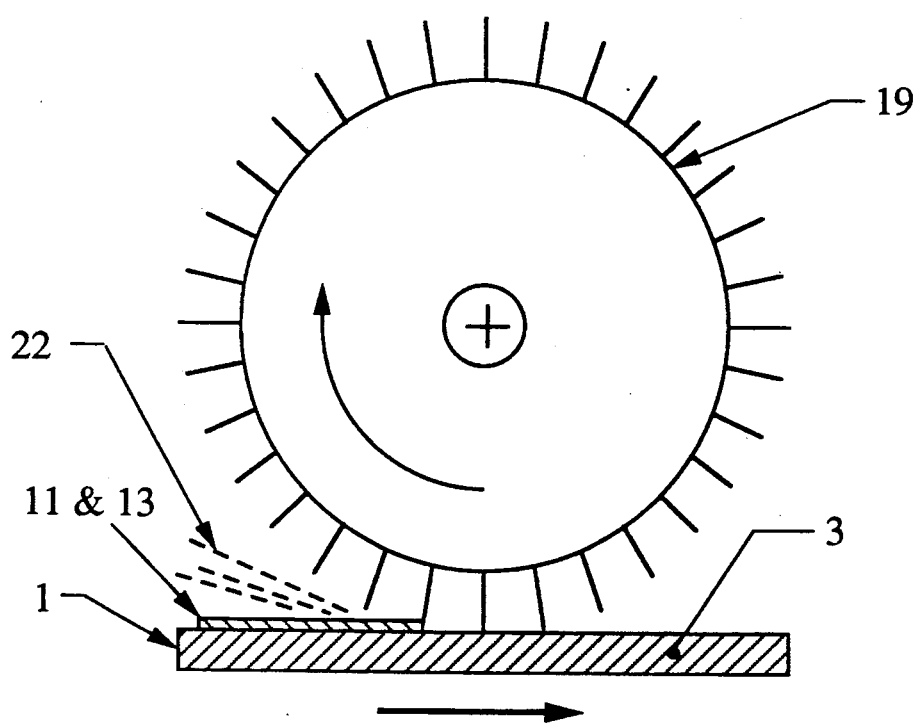
Figure (6)

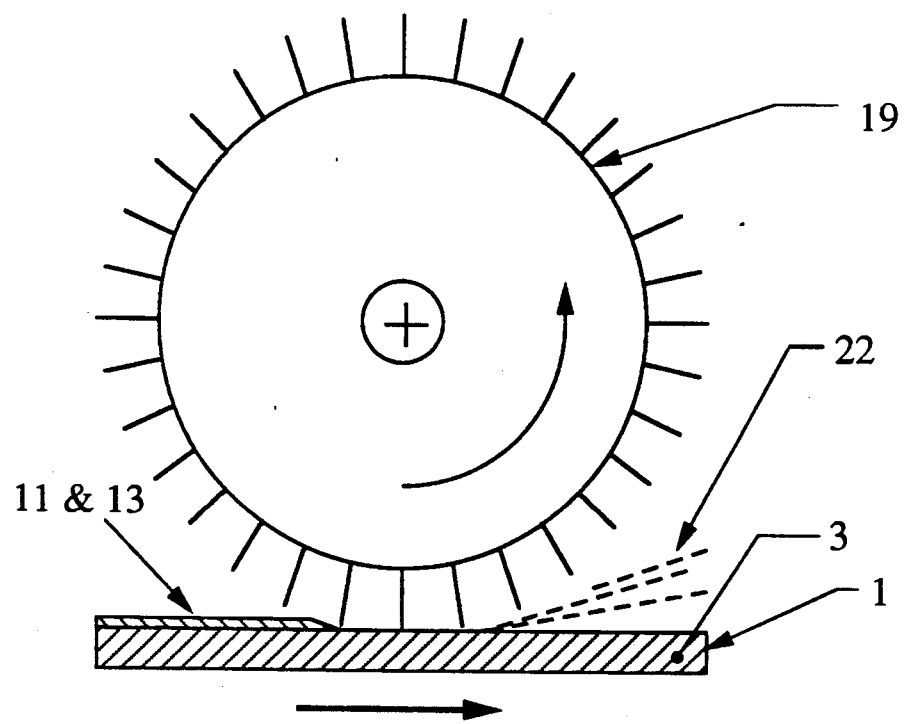
Figure (7)

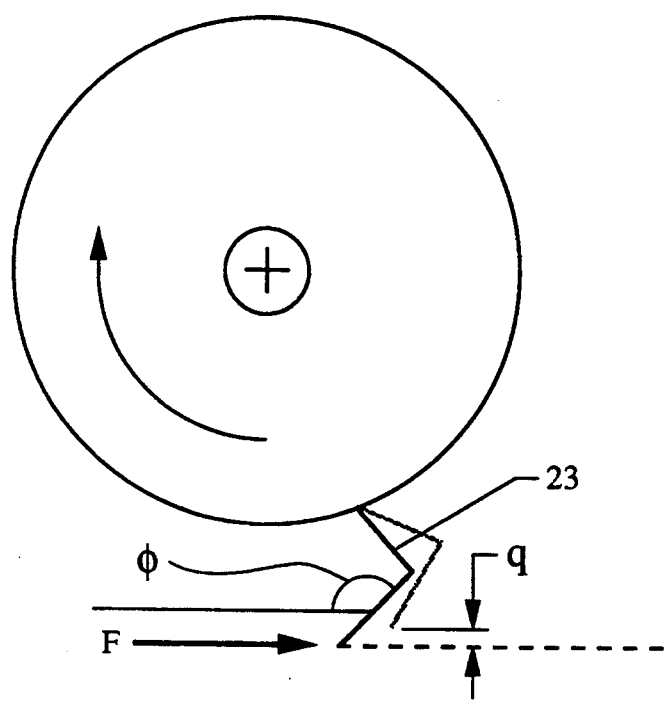
Figure (8)

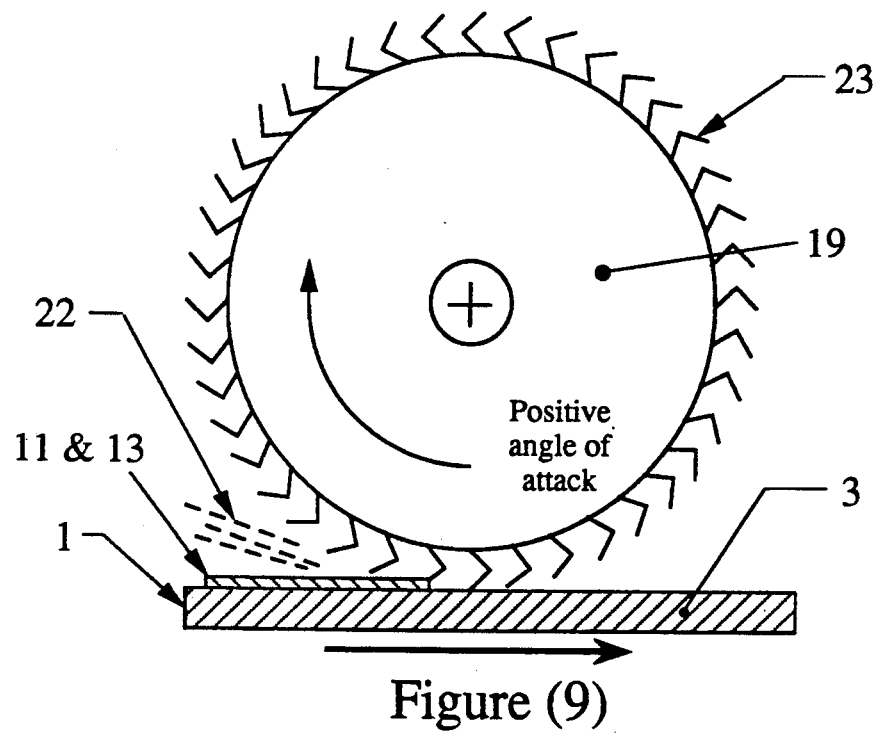
Figure (9)
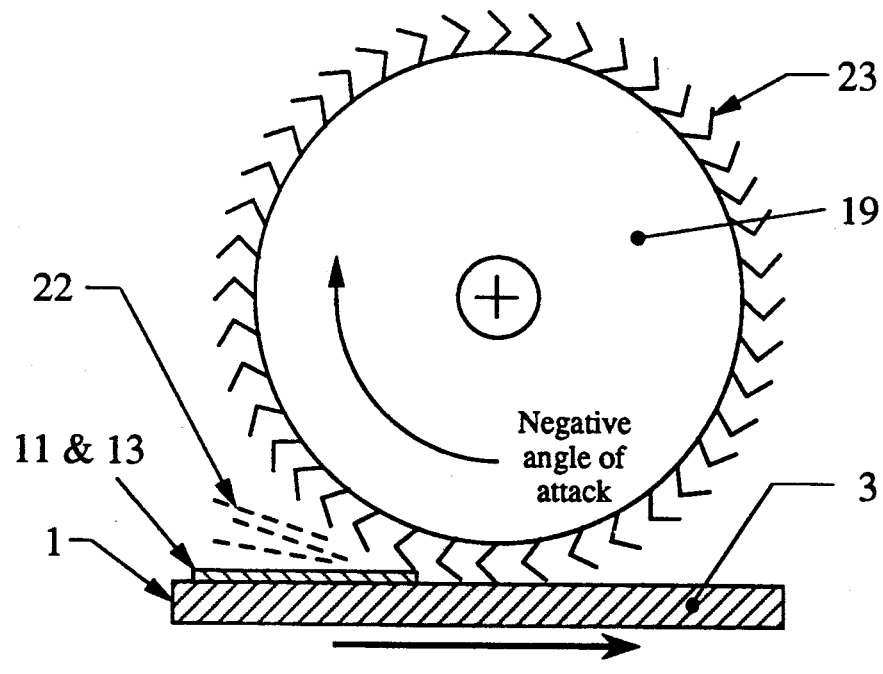
Figure (10)

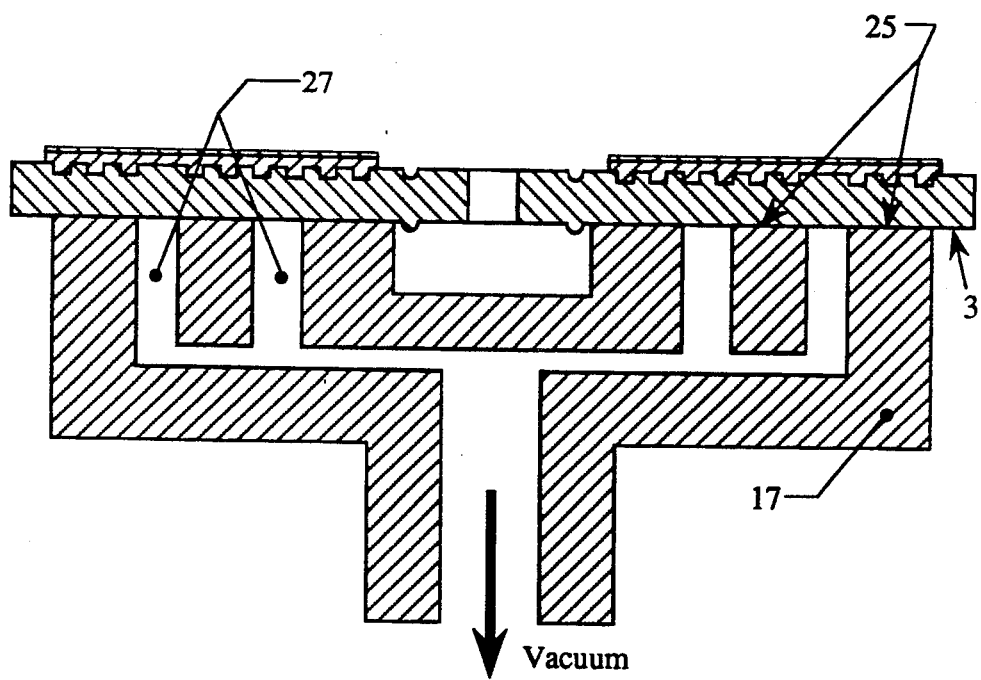
Figure (11)

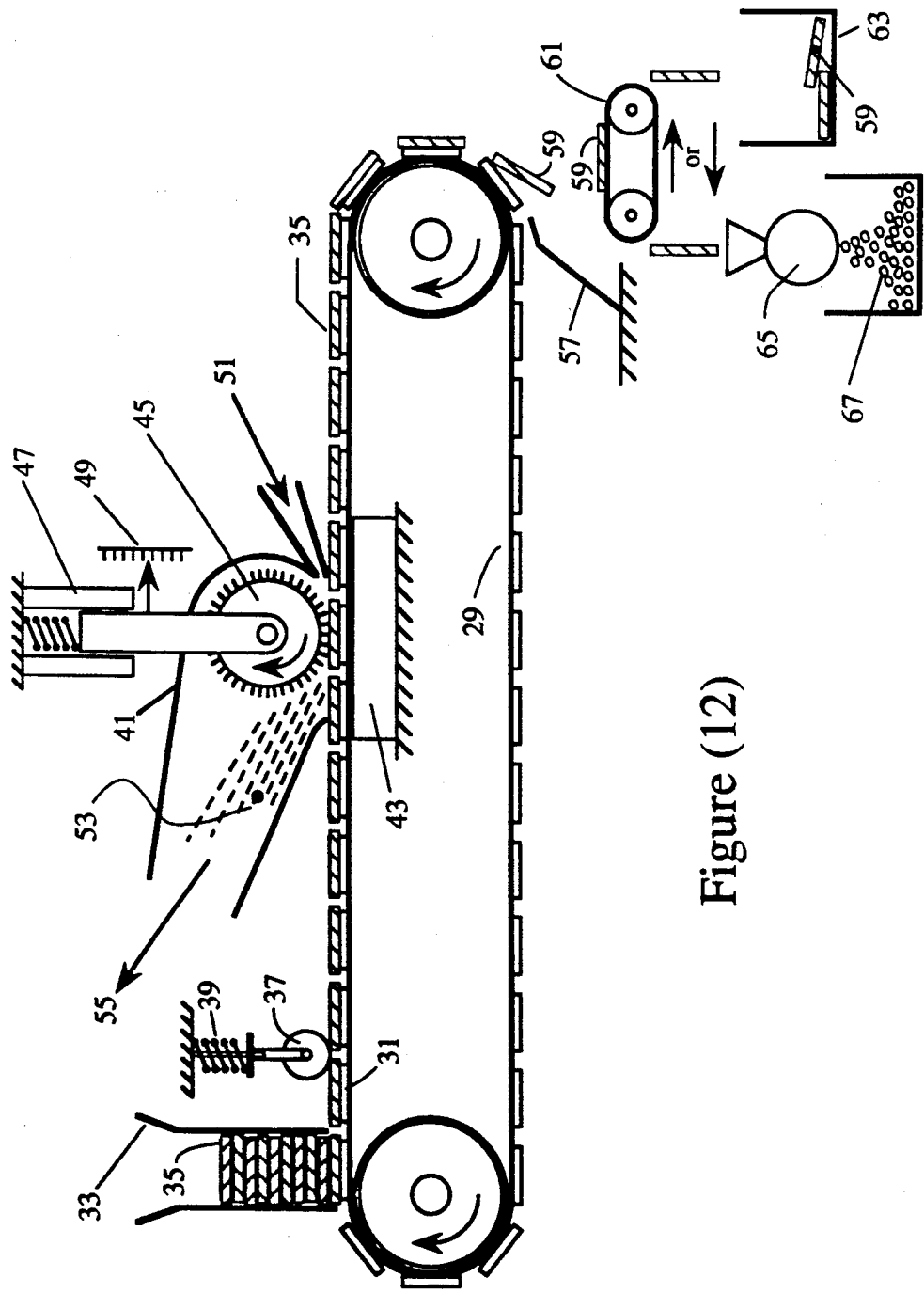
Figure (12)

RECOVERED COMPACT DISK AND A METHOD AND AN APPARATUS FOR RECOVERY THEREOF

FIELD OF THE INVENTION

The present invention is in the filed of recovery of coated plastic material for subsequent uses and/or for recycling purposes. In particular, the present invention provides a method and an apparatus for recovery of Compact Disks or other optical memory storage disks for potential subsequent uses and for recycling purposes.

BACKGROUND OF THE INVENTION

As shown in FIGS. (1), (2), (3) and (4), in its simple form, an optical memory storage disk (Compact Disk) 1 is comprised of a formed disk 3 made of a transparent thermoplastic material such as polycarbonate. The upper surface 5 of disk 3 contains indentation 7, known as pits of varying sizes which are arranged in a continuous planar spiral with a very small radial spacing, (a), shown in FIG. (3), typically 1.6 microns. The pits 9 are coated with a very thin layer of metal, typically aluminum, to form a metallized reflective surface 11. For protection of surface 11, a protective surface/coating 13, typically acrylic lacquer or other transparent polymer or lacquer, is applied over surface 11. As such, the transparent thermoplastic disk 3 and coating 13 sandwich the memory storage metallized reflective surface 11 wherein a laser beam 15 is directed through the transparent disk 3 to read stored information.

The introduction of compact disks is a major step in the development of permanently recorded information media. As such, unless recovered, production defective disks and consumer-discarded disks represent a significant polymeric material loss and add to solid waste stream.

Therefore, a need exists for a method for recovering the polymeric material contained in defective and/or discarded compact disks.

The present invention provides a method and an apparatus for recovery of compact disks while maintaining the structural form and integrity of recovered disks for potential post-recovery uses such as punched washers, inexpensive electrical insulation washers or any application which requires the use of or may utilize thin disks.

BRIEF DESCRIPTION OF THE DRAWING

FIG. (1) shows top view of compact disk in accordance with prior art.

FIG. (2) shows a cross-sectional view of compact disk in accordance with prior art.

FIG. (3) shows detail of spiral arrangement of compact disk pits in accordance with prior art.

FIG. (4) shows detail of laser beam interaction with the metallized reflective surface of compact disk in accordance with prior art.

FIG (5) shows a side view of compact disk holder and coating removal brush.

FIGS. (6), (7), (8), (9) and (10) show a variety of brush wire configurations.

FIG. (11) shows a cross-section of a disk vacuum holder.

FIG. (12) shows a schematic of an apparatus for recovery of compact disks.

DETAILED DESCRIPTION OF THE INVENTION

In accordance with the present invention, as shown in FIG. (5), the 61 compact disk 1 is held upon a holder 17 such that its protective coating 13 is exposed to the action of an abrasive surface, for example a sanding or wire belt or a brush. Due to its simplicity, a wire of bristle brush 19 is preferred since it provides an effective yet a gentle means for scraping the protective coating, the reflective surface, and pits off formed disk 3. For maximization of recovered disk thickness, it is important that the abrasive surface used be of a gentle action nature. As shown in FIG. 5, brush 19 rotates in a clockwise direction while compact disk 1, held by holder 17 is fed from left to right. The orientation angle $\theta$ of wires 21 may be varied in order to alter the angle of scraping action $\phi$. For $\theta < 90°$ the angle $\phi$ is larger than 90° and a harsh scraping action is obtained which enables the use of a faster rate of disk feed and thus a higher disk throughput rate. On the other hand, for $\theta > 90°$ or by reversing the direction or rotation of brush 19 the angle of scraping action $\phi$ is less than 90°, a gentler scraping action is obtained and a maximization of thickness of recovered disk is realized, though at a reduced disk output rate. An angle $\theta$ of 90° may also be utilized as shown in FIGS. 6 and 7. As shown in FIGS. 5, 6 and 7, the fragments 22 of the scraped off protective coating and reflective surface are blown away by the tangential action of brush wires 21.

Where the angle of scraping action $\phi$ is larger than 90°, there is a distinct possibility of wire tips digging deeper into the thermoplastic disk 3 and thus reducing its recovered thickness and/or permanent buckling of brush wires 21. Thus, in accordance with the present invention, a special wire configuration, in a knee-shape, is preferred in order to provide an angle of scraping action $\phi$ than 90° while providing a means for avoiding wire damage and excessive digging action into disk 3. As shown in FIG. (8), when a resistance force F is applied at the tip of knee-shape wire 23, the entire wire deflects backwards and provides a clearance spacing thus avoiding digging into disk 3 and/or wire axial buckling.

FIGS. 9 and 10 show the use of knee-shape wire 23 in positive angle of attack ($\phi > 90°$) and negative angle of attack ($\phi < 90°$) configurations, respectively.

The brush wire may be made of metal, plastics, natural fibers, animal hairs, other materials or any combination thereof. Also, for enhanced disability, the brush wire may be coated or impregnated along its entire length and/or at its tip with higher hardness material, such as abrasive grit, ceramic material or other protective coating.

Also, in accordance with the present invention, a plurality of abrasive surface)—(sanding or wire belts or brushes)—may be utilized in order to achieve the scraping action in successive steps.

In order to provide additional control in scraping action, the abrasive surface used for scraping the disk surface is preferably mounted on a holder fitted with a means for controlling the normal load acting on the disk, for example by a spring loading system.

For holding disk, in accordance with the present invention, a variety of methods may be applied such as the use of single for double-sided self adhesive tapes, thin clamping rings or prongs or vacuum suction surfaces. In its preferred embodiment, a disk holder is comprised of a flat surface through which air suction holes, slots or annular rings provide a pressure differential for holding the uncoated side of disk onto holder 17. As shown in FIG. (11), holder 17 provides a flat surface 25 and air vacuum channels 27 for vacuum holding disk 3.

In accordance with the present invention, an apparatus is provided for recovery of compact disks at a high output rate. As shown in FIG. 12, such apparatus comprises a conveyor belt 29 carrying vacuum holders 31. Automatic dispensing means 33 contains disks to be recovered 35 for placing them on vacuum holders. Compression roller 37 applies a gentle pressing down action on dispensed disks in order to ensure an effective vacuum holding action on the disks. Spring 39 provides a means for controlling such pressing down action. As vacuum holders enter the scraping action zone 41, a rigid height control reference surface 43 ensures that all vacuum holders are at the same height. A scraping means, typically brush 45, suitably mounted and subject to pressure control under the action of spring 47 as indicated on pressure control indicator 49, rotates to scrape the protective coating, reflective surface and pits off compact disk 35. A means 51 is provided for entry of ambient air, inert gas or controlled temperature air into the scraping action zone 41. The air and scraped off particles 53 are directed to air suction means 55 preferably fitted with a high efficiency air filtration means. After the compact disks are scraped off, a disk knock-off lever 57 removes the scraped disk 59 from holder 31. Alternatively, gravitational action alone may be sufficient to do so. The scraped off disk 59 is directed by directing chute or belt means 61 either to granulator 65 for production of granulated chips 67 or to bin 63 provided for receiving scraped-off disks 59 for subsequent uses such as thermoforming into useful articles or punching out into insulations washers or other useful applications.

Alternatively, the scraping means described above, including brushes or belts, may be substituted with fluid (gas or liquid)-carried sand blasting or abrasive blasting means for accomplishing the same scaring action and objectives of the invention.

Though not commercially available at the present time, optical memory storage compact disks may also be produced in a double-sided configuration. The present invention provides a method and an apparatus for recovery of such double-sided compact disks by scraping one side at a time.

Although alternative as well as preferred embodiments of the invention have been described hereinabove, it should be understood that those skilled in the art may make numerous changes without departing from the spirit and scope of the invention.

We claim:

1. A method for recovery of optical memory storage compact disk, said compact disk comprising a thermoplastic polymeric disk, said polymeric disk having a coating on at least one side thereof, said coating comprising a reflective surface and a protective surface, the method comprising the steps of;

holding said compact disk and application of a scraping action to said coating on said at least one side of said compact disk for removing said reflective surface and said protective surface.

2. The method in accordance with claim 1 wherein said holding is accomplished by a vacuum suction providing means.

3. The method in accordance with claim 2 wherein said scraping action is accomplished by a rotating brush means.

4. The method in accordance with claim 1 wherein said holding is accomplished by a self adhesive tape.

5. The method in accordance with claim 1 wherein said holding is accomplished by thin clamping rings.

6. The method in accordance with claim 1 wherein said holding is accomplished by thin clamping prongs.

* * * * *